United States Patent [19]

Holzhauer

[11] Patent Number: 4,629,923

[45] Date of Patent: Dec. 16, 1986

[54] COMMUTATOR FOR DYNAMO ELECTRIC MACHINES

[75] Inventor: Anton Holzhauer, Sigmaringendorf, Fed. Rep. of Germany

[73] Assignee: Robert Bosch GmbH, Stuttgart, Fed. Rep. of Germany

[21] Appl. No.: 764,316

[22] Filed: Aug. 9, 1985

[51] Int. Cl.[4] .............................................. H02K 13/04

[52] U.S. Cl. .................................... 310/234; 310/235; 310/237

[58] Field of Search ................................ 310/233-237, 310/43, 219, 45, 232, 42; 174/138 R; 29/597

[56] References Cited

U.S. PATENT DOCUMENTS

| | | | |
|---|---|---|---|
| 3,102,965 | 9/1963 | Ickes | 310/235 |
| 3,171,998 | 3/1965 | Bath | 310/235 |
| 4,369,566 | 1/1983 | Skrdlant | 29/597 |

FOREIGN PATENT DOCUMENTS

| | | | |
|---|---|---|---|
| 0468616 | 7/1937 | United Kingdom | 310/235 |
| 0620930 | 4/1949 | United Kingdom | 310/235 |

OTHER PUBLICATIONS

"The New Yorker"; an article, Annuals of Law, pp. 49 and 50; P. Brodeur; 6/10/1985.

*Primary Examiner*—R. Skudy
*Attorney, Agent, or Firm*—Frishauf, Holtz, Goodman & Woodward

[57] ABSTRACT

To permit use of asbestos-free insulating material in the manufacture of commutators, while insuring reliable retention of the commutator segments, the commutator segments are formed with projecting leg portions which are embedded in the insulating body, a first leg portion being formed with a projection which extends circumferentially towards the second leg portion of a neighboring segment and overlaps, at least in part, the neighboring segments and forms therewith an interlocking fit, interlocking at least in radial direction, the interlocking fit leaving a gap between the first leg portion of one segment and the neighboring segment to provide for insulation between the segments. The hook-shaped interengagement, which may, also, include interengaging fits of attaching tabs or lugs for winding ends, maybe S-shaped, or otherwise provided for an interlock which locks the segments securely in position, resistant to radial as well as tangential forces which arise during operation of the machine, due to centrifugal force and friction of engaging brushes.

15 Claims, 4 Drawing Figures

COMMUTATOR FOR DYNAMO ELECTRIC MACHINES

The present invention relates to commutators for dynamo electric machines, and more particularly to commutators suitable for high-speed dynamo electric machines using insulation which specifically is free from asbestos.

BACKGROUND

Direct-current and series-type dynamo electric machines utilize commutators, which have commutator segments embedded in an insulating bushing or insulating ring. The segments, usually, have a dovetailed end, located symmetrically to the axis of the commutator shaft, and include anchoring elements or devices. Commutators of this type, when used with an insulating body or bushing or insulating element which is free from asbestos may lose segments, at high-speed operation, due to the centrifugal forces acting on the insulation. This is particularly so if the commutators have many, and hence narrow segments, or are tiny; additionally, of course, the narrow tiny segments will result in tiny connecting ends to connect the commutator segments to the winding ends of the armature of the dynamo electric segments to the winding ends of the armature of the dynamo electric machine. It is difficult to fix, for example by welding, the ends of the windings to the segments or to the connecting ends in such a manner that the winding ends are reliably retained against centrifugal forces acting on the winding ends and/or the commutator segments during operation of the dynamo electric machine, and in such a manner that the insulation compound, filled into the gaps will not be interfered with. Therefore the insulation between the commutator segments must, additionally, be resistant to heat.

THE INVENTION

It is an object to provide a commutator for dynamo electric machines in which the segments are formed with an attachment arrangement which reliably retains the commutator segments and winding connection tabs, if used, on the commutator. The arrangement is suitable both for drum-type or sleeve-type commutators, as well as for plan or disc-type commutators.

Briefly, the segments are formed with split leg portions, that is, first and second leg portions, which are so shaped that a first leg portion of one segment extends towards the second leg portion of the other, and forms an interlocking, interengaging fit therewith, spaced, however, from the second leg portion by a gap which is filled with insulation material. The interfitting arrangement permits placing the insulating material between the first and the second leg portions of adjacent commutator segments under compression when the machine operates. It is well known that insulating material has high compressive strength, but its tensile strength is much less.

The commutator has the advantage that it is highly resistant to centrifugal, that is, radial, as well as tangential forces acting on the commutator. The segments are interlocked, in an endless chain—when assembled—at least in a direction radial with respect to the longitudinal axis of the commutator. This arrangement essentially relieves the insulating material between the segments from tensile forces. The commutator is highly resistant against centrifugal or spinning forces, is heat-resistant, and connecting wires can readily be connected thereto without interfering with the insulation between the segments.

In accordance with a preferred feature of the invention, the attachment or securing arrangement of adjacent commutator elements can be placed in a small space, important, for example, for smaller commutators, by using an asymmetrical structure of the cross section of the segments. Such an arrangement can be used for a drum-type commutator with, or without connecting tabs, to attach the ends of the armature windings. If the connecting tabs extend from the commutator segments, it is possible to additionally interlock the connecting tabs together in the region of the insulating gap between the connecting tabs, which separate them from each other.

The commutator, additionally, has the advantage of easy manufacture, which permits economical production thereof, for example by formation of a commutator segmental ring by cold-flowing of the metal. Segments without a connecting tab flange, or segments of a plan or disk-type commutator can be cut easily from a blank structure, having the shape of the segments with attachment legs.

DRAWINGS

DETAILED DESCRIPTION

Commutators for dynamo electric machines are built up of separate insulated segments, secured to an insulator sleeve or bushing. At the end regions of the commutator, terminals to connect the ends of armature windings of an electric machine are provided. The insulator, customarily, surrounds a bushing or sleeve, which forms a bearing arrangement, through which the rotor shaft of the electrical machine extends. The segments are customarily made of a pressed or deformed metal strip or tube, which may be made of a metal strip rolled into tubular form or a formed tube. After introducing the insulating body into the preshaped tube, connecting strips which connect the commutator segments as they are being manufactured are removed. The commutator segments and the insulator body are attached together, by clamping or insertion, and, if necessary, external holding rings or rovings are placed around the commutator segments to hold them on the insulator sleeve. The segments may form drum commutators, with or without connecting tabs or connecting lugs, or may be constructed as plan or disk or "pancake" type commutators, against the segments of which brushes are placed in axial direction. Regardless of the type of commutators, the various segments mus be reliably attached to the insulating substrate in order to prevent fly-out of commutator segments under centrifugal force upon operation of the electric motor. The insulation between the segments must be resistant to the voltage gradient, and resistant to heating which arises in operation of the machine.

Figure 1:
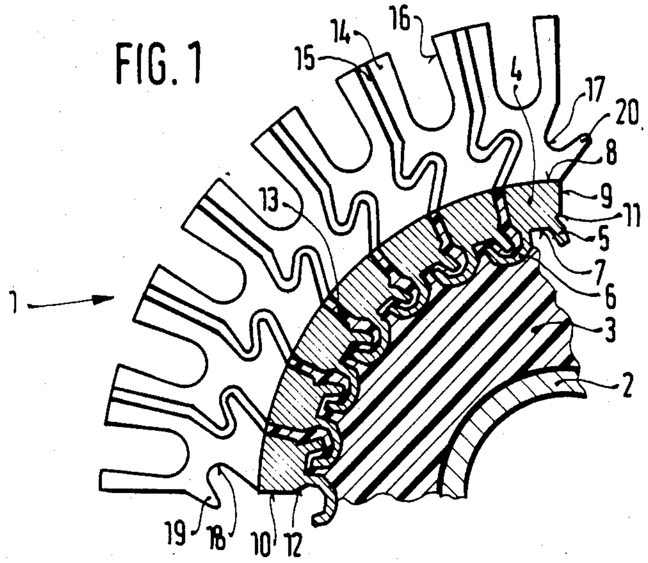
FIG. 1 is a fragmentary cross-sectional view through a drum-type commutator illustrating a first embodiment of the invention.

Referring first to FIG. 1: The commutator 1 has a bearing sleeve 2, shown only in fragmentary representation, and concentric with the axis (not shown) of a rotor shaft of a dynamo electric machine, which may be a motor or a generator. An insulating body 3 is provided, surrounding the sleeve 2. The insulating body 3, typically, is a sleeve or bushing of insulating material. Due to the health hazard in connection with manufacutre of asbestos, previously used insulating material which included asbestos is no longer needed, while retaining the advantages of prior asbestos-containing insulating materials. In connection therewith, see, for example, a series of articles on asbestos in "The New Yorker", first article in issue of June 10, 1985, page 49 et seq. and in subsequent issues, by Paul Brodeur.

The commutator segments 4 are secured in the insulating body 3. The commutator segments 4 are made of good electrically conductive and heat-conductive material, for example copper or copper-based alloys.

The commutator segments 4—"segments" for short—are made by cold-flowing or cold-pressing copper from a commutator segmental ring, having inner ribs. Upon cold-forming of the metal, the anchoring extensions are simultaneously formed when extruding the segments 4. The shape of the anchoring extensions or legs is particularly suitable for commutators with small external diameter and/or high pitch of the commutator segments, that is, a large number of segments in a small circumferential space.

In accordance with a feature of the invention, the anchoring or attachment arrangement or means of the segments 4 is formed of two legs 5, 6 (FIG. 1) which are separated from each other by a gap or separating groove 7. The legs 5, 6 extend over the entire axial length of the segments 4. The segments 4, essentially, are trapezoidal in cross section and have an outer running surface 8 which is curved in accordance with the diameter of the commutator, to receive brushes running thereon, as is well known in the dynamo electric machine field. The longitudinal sides 9, 10 of the segments 4 are slightly recessed at their lower edges, as seen at 11, 12, from which the legs 5, 6 extend at a suitable angle; as shown, the legs 6 extend at a right angle from the recess or groove 7; the leg 5 extends at an obtuse angle therefrom.

The legs are non-symmetrical. Leg 5 is shaped as a short projection, which extends at an acute angle with respect to a center line of the segment 4. The center line of the segment 4 is a theoretical line which could be considered to pass perpendicularly to the tangent of the running surface 8 and radially to the center of rotation of the shaft of the rotor of the machine, that is to the center of the ring or sleeve 2. The leg 5 extends slightly outwardly over the lateral side 9 of the segment 4, that is, extends outwardly in circumferential direction.

The leg 6 is shaped to form an interlocking engagement with the leg 5, with a gap therebetween, which gap is filled with insulating material. As best seen in FIG. 1, the leg 6 is shaped to be essentially semi-circular, with a center of curvature approximately in alignment with the gap between adjacent or neighboring segments 4. The separating or segmental gap 13 between the segments 4 is filled with the insulating material which, also, separates the legs 6 from the legs 5 of adjacent or neighboring segments 4. The center line between neighboring segments 4 extends essentially radially with respect to the longitudinal axis of the commutator 1, the center of the semicircular portion of the leg 6 being located at least approximately on this center line. The leg 6 fits, or reaches around the leg 5 with a spacing of approximately the width of the legs of the neighboring segment 4, again leaving a gap from the end of the leg 6 to the root of the spacing or gap 7 of the neighboring segment 4 to permit insulation to be placed therein. Thus, the segments 4 are interlocked or anchored together by the legs 5, 6, and securely maintained with respect to radial as well as tangential forces which may be applied to the commutator in operation of the dynamo electric machine, to counteract centrifugal forces as well as tangential forces applied by the brushes. The segments 4, by this interlock of the legs 5, 6, are thus radially and tangentially interlocked in a continuous chain. The pressure, tension and shear forces acting on the commutator 1 in operation of the dynamo electric machine thus can no longer so affect the segments 4, locked into the insulating body 3, since the insulating material—as is well known—has high compressive strength, more so than tensile strength.

The commutator shown in FIG. 1 is formed at its end with connecting lugs or tabs 14 which are unitary with the commutator segments 4, and formed upon flowing the metal during extrusion pressing. The connecting tabs or lugs 14 are separated from each other by separating gaps 15. The separating gaps 15 are in alignment with, and start from, the segmental gaps 13. They have an essentially S-shaped portion, matching with and flush with the end portion of the gap 13, and extending towards the end of the connecting grooves or depressions 16 of the respective connecting lugs 14. The ends of the rotor winding are secured in the depressions or grooves 16 in any suitable manner, preferably by a welding process, not shown in the drawings, and which may be conventional. The S-shape of the lug separating grooves 15 provides an additional radial and tangential interlock of the segments 4. The segments 4 are, each, formed with a respective depression 17, 18, at each opposite side of the lugs and, projecting from the depression, with projecting noses 19, 20, so that the connecting lugs themselves will, also, form an interlocked chain. The gaps 15 between the connecting lugs 14 are filled with insulating material to form one continuous structure, which additionally contributes to the resistance of the commutator to centrifugal forces and serves as an electrical insulation between the lugs 14.

EMBODIMENT OF FIG. 2

This structure is particularly suitable for commutators of larger diameter or for smaller commutators with few large segments. Commutator 21 has a central or bearing sleeve 22 which can be fitted over the shaft of a dynamo electric machine, carrying the rotor thereof, in a well known and conventional manner. The bearing sleeve 22 is surrounded by an insulating body 23, formed as a sleeve or bushing. The insulating sleeve or bushing 23 has a commutator segmental ring attached thereto, made, for example, by extrusion pressing of a commutator segmental ring. The commutator segments 24, which are formed as inner ribs during the flow extrusion, are separated from each other after the segments are secured in the insulating sleeve 23. The attachment of the segments to each other can be external of the insulating body, for example by small bridges connecting neighboring segments in the region of the terminal end of the insulating gaps between the segments, which bridges are removed after the segments are seated in the commutator insulator.

The segments 24 have an essentially trapezoidal outer portion with a curved running surface 25, matching the diameter of the commutator 21. The converging longitudinal sides 26, 27 of the segments 24 are separated by segmental separating gaps 28, filled with insulating material of the insulating body 23, thereby separating the segmental elements 24 in circumferential direction. The inner portions of the segments 24 are formed with anchoring elements in order to securely attach the segments 24 on the insulator bushing 23. Two legs 29, 30 are formed, extending over the entire axial length of the respective segments 24. The legs 29, 30 are separated from each other by a central gap 31. The gaps 31 are located at the inner face of the segments 24. The gaps 31 are asymmetrically positioned with respect to a center line extending radially through the segments 24, taken, for example, at the circumferential surface 25, that is, the separating gap 31 between the legs 29, 30 is positioned off-center or outside of the center line of the segment 24. The legs 29, 30 are bent outwardly in circumferential direction. They have enlarged end portions 32, 33. A second recess or groove 34 is located adjacent the leg 29 at the facing side of the segment 24. The legs 29, 30 engage with a gap 35 for insulating material—into the gaps 31, 34 of both adjacent segments 24. The gap 35 has approxiamtely the width of the insulating gap 28 between the radially extending surfaces of the segmental elements 24. The extension of the legs 29, 30 into the respective grooves of both adjacent neighboring elements, that is, adjacent the two radial sides 26, 27 of any one element, forms a secure endless chain connection, interlocking the commutator segments 24 of the commutator 21, reliably, both radially and, tangentially relieved of tension, as well as of compressive forces acting thereon, which arise during operation of the dynamo electric machine due to centrifugal forces and friction of brushes on the commutator 21.

Figure 2:
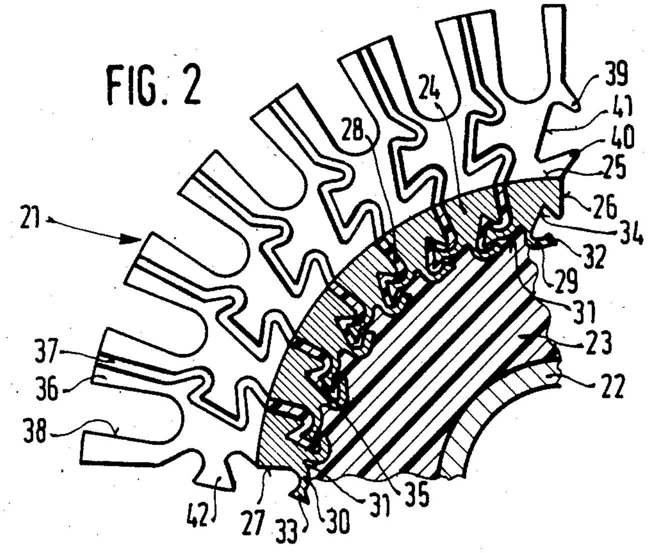
FIG. 2 is a fragmentary cross-sectional view through a drum-commutator illustrating another embodiment.

The commutator segments 24 are provided with connecting lugs 36. The connecting lugs are each shaped as a radially extending flange, integral with the commutator segments. Insulating gaps 37 are formed between neighboring connection lugs 36 which, as in the embodiment of FIG. 1, are filled with the same insulating material, for example, the same as the insulating material of the sleeve or bushing 23. The separating gaps 37, in the embodiment of FIG. 2, have essentially Ω-shaped portions which start at the radial outer end of the segmental grooves 28 and are flush therewith. The generally Ω-shaped portions are then joined by an end portion which merges into the segmental groove 28.

Each connecting lug 36 is formed with a slit 38 to receive the winding ends of the rotor winding of the dynamo electric machine, and to be attached therein in any well known and suitable manner, for example by welding.

The generally Ω shape of the separating grooves 36 of the connecting lugs provides for additional radial and tangential interlock of the segments 24. The Ω shape is formed by two projections 39, 40 which, in circumferential direction, extend over one side of a connecting lug 36 and define, between the noses 39, 40, a recess 41 in which a projection 42 of the neighboring connecting lug 36, formed at the opposite side thereof, fits and interlocks, in dovetail interlocking connection. The projection 42 and the noses 29, 40 are similar to the ends 32 33 of the attachment legs 29, 30 of the segments 24, and are provided to prevent damage to the insulating material in the gaps 28, 37, respectively, due to tangential and radial forces which arise in operation of the dynamo electric machine.

The segments 4, 24 can be made by cold metal flowing, extrusion presses, or the like, or the commutator segmental rings, with the respective legs formed during the manufacture of the commutator segmental rings, suitably shaped, as inner ribs. The profiles of the inner ribs can be readily determined by the profiles of extrusion press or die elements. In manufacture, the segmental grooves 13, 28 of the inner ribs and the gaps 15, 36 of the connecting lugs are bridged by connecting bridges of the original material which, after formation of the insulating body 3, 23 and after introduction of the insulating material in the respective separating gaps, are removed, in accordance with well known procedures.

Some drum-type commutators are made without attachment lugs; such drum-type or cylindrical commutators can be made from a rod or tube by extrusion profiling of commutator material, thereby eliminating any waste or scrap which arises in the manufacture of the commutator. The specific cross-sectional shape of the segments 4, 24, with the respective legs 5, 6; 29, 30, is shaped during extrusion. The segments need not be connected together or remaining connected as a ring, during manufacture, since the segmental elements can be assembled together in any suitable manner, well known, on the insulating sleeve or body.

Figure 3:
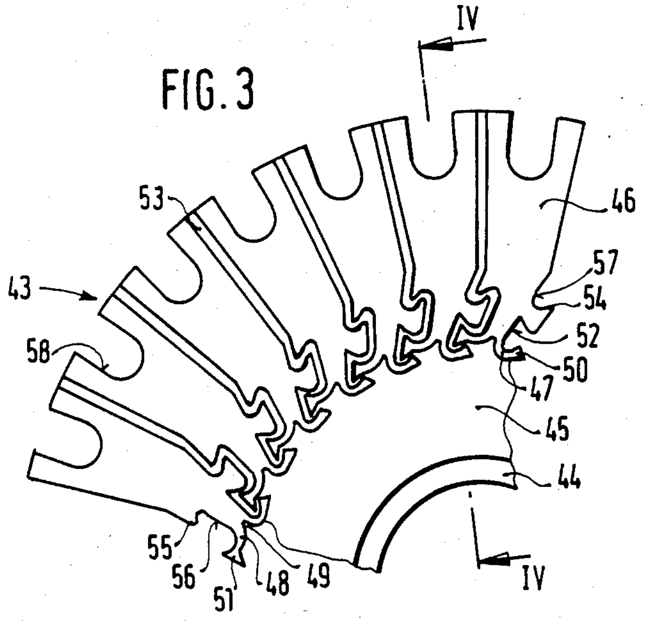
FIG. 3 is a plan view of a planar commutator.
Figure 4:
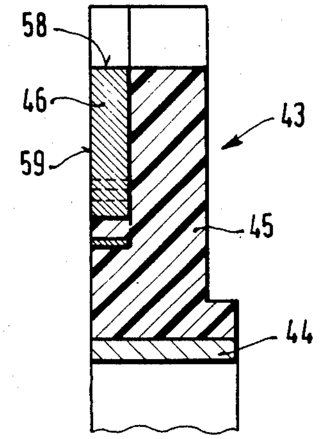
FIG. 4 is a cross section along line IV—IV of FIG. 3.

The present invention can be used not only with drum or cylindrical commutators, but also with flat or disk-type commutators. FIGS. 3 and 4 show, respectively, a plan view and a section through a disk-type commutator, in which the commutator segments are anchored to a substrate or insulating holding element which has a surface on which the plan or flat segmental elements are secured. The anchoring elements can be formed on the side of the segment opposite running surface of the segment and/or at the inner side extending radially with respect to the rotor shaft, and embedded in the insulating body which is suitably shaped to receive the attachment or securing legs and segments.

Referring to FIGS. 3 and 4: A plan or disk commutator 43 is provided with a disk-shaped insulating body 45. A bearing sleeve 44 and a commutator segmental ring are fitted into the insulating body 45. The commutator segmental ring has commutator segments 46, positioned in the shape of radial ribs, connected to each other by briding elements which bridge the separating or insulating gaps 53, and which are removed after forming the insulating body 45, thereby attaching the segments 46 thereto and filling said gaps 53 with insulating material.

The segments 46 may be comparatively thin portions of an elongated element shaped in accordance with the present invention, to have the cross section which defines the interlocking interengaging legs to form the attachment of the segments 46 with respect to each other and the commutator structure as a whole so that, when the segments are interlocked, the commutater 43 will be formed.

The segments 46, essentially, are sector-shaped at their inner portion, and are formed with interlocking, interengaging regions. The segments 46 are attached to the insulating body 45 by two legs 47, 48 which define between themselves a gap 49, at the inner side of the segments 46. The gap 49 is positioned off-center with respect to the segments 46, in which a theoretical center line of the segments 46 may be considered as extending radially through the segments from an outer portion thereof forming the running suface of connecting brushes. The legs 47 and 48, adjacent the asymmetrical gap 49, are shaped similarly to the legs 29, 30 of the commutator 21 of FIG. 2. They are bent outwardly, and have enlarged ends 50, 51. A recess 52 at the inside of the segments 46 is formed adjacent the leg 47. The legs 47, 48 of one segment interlock with the segmental recesses of neighboring segments both at the right and at the left, with a gap 53, forming an insulating gap. The gap 53 is filled with insulating material, typically the material of the insulating ring 45. Thus, all the segments are interlocked together, with adjacent segments on both sides of any one segment.

The segmental gaps 53 continue, outwardly, in a generally Ω-shaped portion which is defined by noses 54, 55 and gaps 56, 57 at the sides of the segments 46. The noses 54 and 55 extend circumferentially beyond the sides of the segments 46 and engage in the recesses 56, 57 of adjacent segments 46, leaving, however, a gap to form the segmental insulating gaps 53. The segments 46, thus, are thereby securely retained on the insulator 45 by the attachment elements 47 to 52, and the projections 54, 55 fitting into the recesses 56, 56. Thus, the segments, together with the attachment portions thereof, are radially and tangentially interlocked, thereby preventing damage to the insulating material in the separating gaps 53 which may arise in operation of the dynamo electric machine due to centrifugal and frictional forces in radial and tangential direction. The outer portion of the segmental gaps 53 extends radially with respect to a longitudinal axis of the disk commutator 43. The outer circumference of the segments is formed with a slit 58 in which the winding ends of the rotor windings are secured, in any suitable and well known manner, standard in the particular technology. The plane or flat running surface 59 is located in the region of the outer portion of the segmental gaps 53, defined by the facing side off the segments 46, to have brushes sliding thereon. FIG. 4 illustrates a suitable cross section for the commutator 43, in which an insulating disk 45, extending up to the inner portion of the attachment grooves 58, supports the flat or plan segments 46, and shows, essentially, the position of the brush-engaging running surface 59.

Various changes and modifications may be made, and features described in connection with any one of the embodiments may be used with any of the others, within the scope of the inventive concept, which, basically, is directed to so shaping the segments of commutators that interlocking portions are formed thereby, separated by separating gaps which are filled with insulating material while the insulating body is formed, to form a complete commutator in which the individual segments are interlocked.

Examples of suitable materials for the insulating bodies 3, 23, 45, which are asbestos-free: glass fiber reinforced Phenolic resin casting compound, or Mica-reinforced Phenolic resin casting compound.

I claim:

1. Commutator for a dynamo electric machine, having an annular insulator body (3,23,45);

a plurality of commutator segments (4, 24 46) disposed around the circumference of said insulator body, each of the segments having attachment means formed thereon to attach the segments to the insulator body (3,23,45), neighboring segments being spaced from each other and defining an insulating gap (13, 28, 53) therebetween, in which gap insulating material is located, wherein, in accordance with the invention, the attachment means of the segments (4, 24, 46) comprises first and second leg portions (5,6; 29,32,30,33; 47,48,50,51) integral with the respective segments, the second leg portion (6; 29; 47) extending circumferentially towards the first leg portion (5; 30; 48) of a neighboring segment, overlapping said neighboring first leg portion, at least in part, thereby hooking over said neighboring segment and forming therewith an interlocking fit at least in a direction radial with respect to an axis of said annular insulator body, the first leg portion of a segment being spaced from the second leg portion of the neighboring segment by said gap (13, 28, 53);

said interlocking commutator segments and the insulation material therebetween forming an endless chain in which the segments are, at least radially, interlocked to place the insulating material in the gap under compression as a result of centrifugal forces generated during commutator rotation, and to secure the segments (4, 24, 26) in position on the insulator body (3, 23, 45).

2. Commutator according to claim 1, wherein the segments are formed with a recess (7, 31, 49) between the first and second leg portions (5, 6; 29, 32, 30, 33; 47, 48, 50, 51);

and said one leg portion (6; 29; 47) is fitted to engage in the recess (7, 31, 49) between the leg portions of the neighboring segment, and separated from the neighboring segment by said gap filled with the insulating material of said body.

3. Commutator according to claim 1, wherein the leg portions extend in generally radial direction from the segments and are asymmetrical with respect to a line extending radially from the longitudinal axis of the commutator and through the center line of the respective segment.

4. Commutator according to claim 1, wherein the second leg portion (6, 29, 47) of the segments is formed with a recess, the first leg portion (5, 30, 48) of a neighboring segment entering the recess of said second leg portion of the neighboring segment which leg portions being spaced from each other by said gaps.

5. Commutator according to claim 1, wherein the segment (24, 46) is formed with a recess (34, 49) and the first leg portion (30, 48) of a neighboring segment (24, 46) enters said recess, which recess and leg portion being spaced from each other by said gaps.

6. Commutator according to claim 1, further including a connecting tab (14, 36) integral with each one of the respective segments; and wherein the connecting tabs (14, 36) are formed with interlocking, interfitting projection (19, 20; 39, 40) and recess (17, 18; 41) means, the projecting portions of said projection-and-recess means fitting into the recess portions with clearance defining a separating gap (15, 37), said gap being filled with insulating material to separate the tabs electrically from each other.

7. Commutator according to claim 6, wherein the gaps (15, 37) are shaped to have a portion which places the insulating material in said portions under compression when subjected to forces arising in operation of the machine and extending in radial and tangential direction.

8. Commutator according to claim 6, wherein the shape of the projection-and-recess means and of the gaps between the projecting portions and recess portions is, at least in part, essentially S-shaped.

9. Commutator according to claim 6, wherein the shape of the projection-and-recess means and of the gaps between the projecting portions and recess portions is, at least in part, essentially Ω-shaped.

10. Commutator according to claim 1, wherein the segments are essentially sector-shaped, and the commutator is a cylindrical commutator, the insulating body is formed as an insulator sleeve, and the leg portions, and adjacent regions of the commutator being embedded in said insulator sleeve.

11. Commutator according to claim 1, wherein the commutator is a disk-type commutator (43);

the segments (46) define a flat brush engagement surface (59), and adjacent segments are formed with interlocked, interengaging projection (54, 55) and recess (56, 57) means, in which the projections and recesses are separated from each other by the gap (53) in which insulating material of said bodies is retained, to separate adjacent segments, electrically, from each other.

12. Commutator according to claim 11, wherein the interengaging, interlocking projection-and-recess means, with said gap therebetween, are formed in substantially Ω shape.

13. Commutator according to claim 1, wherein the insulation material in said gap is asbestos-free.

14. Commutator according to claim 1, wherein said insulating body and the insulation in said gap are a single structure, and the insulating material in said gap and of said body are asbestos-free.

15. Commutator according to claim 11, wherein the interlocking, interengaging projection-and-recess means include a portion which, at least adjacent the brush-engaging surface (59), has a compression-transfer ring zone, and the insulation material in said gap is in compressed state, the compression being effected by said compression-transferring zone upon rotation of the commutator, resulting in application of centrifugal force thereto.

* * * * *